Patented Dec. 25, 1951

2,579,946

UNITED STATES PATENT OFFICE 2,579,946

PROCESS FOR FILTERING GLYCERIDE OILS

Herbert Kenneth McClain, Cincinnati, Ohio, assignor to The Procter & Gamble Company, Ivorydale, Ohio, a corporation of Ohio No Drawing. Application July 17, 1946, Serial No. 684,235

9 Claims. (Cl. 210—42.5)

This invention relates to filtration of glyceride oils with a filter-aid, and to the recovery of retained oil from the filter-aid.

It is known that prebleaching or even simple filtration of low grade glyceride oil stocks removes filterable impurities and otherwise improves the quality of the stock, and that the value of such improvement is realized in the avoidance of the difficulties in subsequent processing of the oil and in the improvement in the quality of the finished product. For example, emulsion difficulties customarily observed in the hydrolysis of low grade fats and greaser such as garbage grease, tallow, tank bottoms and the like may be substantially eliminated and an improvement in yield, color, and odor observed in the subsequently distilled fatty acids if the stock prior to hydrolysis is subjected to a filtering process. In the filtration of such stocks, however, the filterable impurities tend to clog the pores of the filter cloth or filter paper used in connection with the filtering mechanism and thus render the process impractical. To minimize such clogging, filter-aids such as kieselguhr or other diatomaceous earths and bleaching clays, which form a filter bed on the cloth or paper of the filtering mechanism, are widely used.

One of the outstanding disadvantages of using kieselguhr and bleaching clays in prefiltering operations, however, is in the loss of oil due to retention of the earth or clay. It is true that processes have been proposed for recovering retained oil from such spent earth and clays but for the most part these processes are uneconomical, inefficient or impractical, especially when the earth has been used to aid in the filtration of a raw glyceride stock which contains mucilaginous material.

In accordance with the present invention, a powdered inorganic water-soluble, oil-insoluble salt which is chemically inert to the oil is employed as a filter-aid, the spent filter-aid and adsorbed impurities and retained oil being subsequently treated with water, whereby the filter-aid is dissolved and the retained oil is liberated for ready recovery. The process will be more fully understood from the following description and examples.

Since a water-soluble filter-aid is employed in the practice of the invention, it is obviously desirable that the water content of the glyceride oil being subjected to filtration be at a minimum before bringing the inorganic salt into contact with the oil. Thus if the oil contains substantially more than 0.2 per cent moisture, it may be advantageously dried under conditions which do not effect undesirable decomposition or deterioration. This may be accomplished in any suitable manner known in the art, such as by boiling off the moisture either at atmospheric or subatmospheric pressure. For example, a raw tallow containing about one per cent moisture may be heated to 230° F. and then passed through a vacuum drier under a pressure less than 5 inches of mercury. The conditions of drying, however, are not critical and may be adjusted to suit the characteristics and moisture content of the oil being processed. If the moisture content is below 0.2 per cent, the drying step may be omitted.

Water-soluble, oil-insoluble inorganic salts which are chemically inert to the oil and which are suitable for use as filter-aids in accordance with the present invention include sodium chloride, potassium chloride, calcium chloride, magnesium chloride, sodium sulfate, potassium sulfate, magnesium sulfate, sodium nitrate, sodium sulfite, corresponding ammonium salts, hydrates of said salts, mixtures thereof, and the like, sodium chloride being preferred because of its ready availability and low cost. In the case of the filtration of substantially neutral oils, such as fully refined vegetable oils, salts such as sodium carbonate or sodium bicarbonate may be employed if desired. Other inorganic water-soluble, oil-insoluble salts known in the art may be employed, but in many instances the relatively high cost thereof makes them unattractive for use in the practice of the invention.

The fineness of subdivision of the inorganic salt employed is of importance in achieving optimum results during filtration, salt particles larger than 150 mesh in size being less efficient in adsorbing impurities, and also having a greater tendency (1) to settle out of the oil while the same is passing through the filtration mechanism and (2) to produce thereby a less uniform coating of the salt on the filter cloth or paper with resultant inefficient operation. Thus a particle size from about 150 mesh to about 300 mesh, especially from about 200 mesh to about 250 mesh, is preferred. Inorganic salts having a smaller particle size than 300 mesh may be employed provided the porosity of the filter paper or cloth permits, and provided that the expense involved in obtaining the salt in such finely divided form does not render the process uneconomical.

The amount of pulverized inorganic salt employed is preferably sufficient to provide a multiple layer coating of salt particles at least $\frac{1}{16}$ of an inch in thickness over the filter cloth or paper through which the oil is to be passed. The volume of salt required to satisfy this preferred condition can be readily determined by calculation and translated to a weight basis. For ordinary operation, approximately one per cent water-soluble inorganic salt based on the weight of the oil will be sufficient. However, variations in the amount used may be desirable to obtain efficient operation at the lowest cost. Amounts as low as 0.25 per cent have been found adequate in the case of oils which have a low content of impurities such as caustic refined glyceride oils, whereas amounts as high as five per cent may be necessary to obtain desirable filtration of low grade tallows and greases.

To obtain an even distribution of the salt over the filter cloth or paper and to achieve maximum filtration efficiency, it is preferable to distribute the salt uniformly throughout the oil and then pass the mixture through the filtration mechanism, recirculation of the oil being effected until a suitable coating of inorganic salt is deposited on the filter cloth or paper and the filtrate becomes clear. It is also preferable to reduce the viscosity of the oil and thereby increase the filtration rate by the application of heat to the mixture of oil and inorganic salt prior to filtration, and temperatures from about 140° F. to about 200° F., preferably around 180° F., has been found suitable.

Although mixing of the inorganic salt filter-aid with the oil and subsequent filtration of same may be conducted batchwise, continuous operation, in which the oil and salt are continuously proportioned, mixed, heated and filtered, may also be practiced without departing from the spirit of the invention.

After the filtration of the charge is complete, or when filtration drops to an undesirable low rate, the filtration mechanism is preferably blown with air to remove as much retained oil as possible. Thereafter the press cake (containing retained oil and filtered impurities) is removed from the press preparatory to oil recovery. The ordinary method of opening the press and discharging the cake by scraping or other means into a treat tank may be employed, or water or other suitable aqueous medium at suitable temperature may be backwashed or otherwise suitably forced through the press to dissolve the inorganic water-soluble salt and flush out retained oil, the solution with entrained oil being discharged to a treat tank. In either case, sufficient water is added to the cake to dissolve the inorganic salt and effect separation of the oil. The use of water in amount equal to about ten times the weight of the spent cake has been found suitable, although smaller and larger amounts varying from five to twenty times the weight of the cake may be employed to suit individual needs and conditions.

The water treatment is preferably conducted at elevated temperature such as from 150° F. to boiling, so as to facilitate the separation of the oil from the salt solution and thus obtain maximum recovery. The higher treatment temperatures are preferred, but care must be taken to avoid undesirable deterioration of the oil. In some cases the contents of the treat tank may be boiled with open steam, then allowed to settle whereupon the oil and salt solution form individual layers which may be readily separated. Centrifugal separation may be used if desired.

Analyses have indicated that the impurity (petroleum ether insoluble material) content of tank-settled oils recovered from the press cake rarely exceeds 0.07 per cent, whereas the corresponding impurity content of oils recovered from spent guhr or earth is usually in the neighborhood of 10 per cent. Because of their relatively low impurity content, the oils recovered by the present process may be used as is, either alone, or in conjunction with the clarified oil from which it originated, or if desirable it may be washed, dried, filtered or otherwise treated to improve its value in any particular use. Oils recovered from spent earths, on the other hand, are so contaminated with impurities that ordinary washing or filtration is impractical, uneconomical or inadequate to purify such recovered oils sufficiently so that they may be used with the clarified oil. More involved purification procedures, including for example separate handling in the liberation of fatty acids by hydrolysis, and subsequent distillation of the liberated fatty acids, have been found desirable.

In the practice of the invention on some oils, especially low grade tallows and greases, a relatively small amount of a dark colored tarry substance, containing recoverable fatty matters, forms a third liquid phase either at the interface of the oil and salt solution or at the bottom of the salt solution depending on the specific gravity of the salt solution as determined by the amount of water used to dissolve the salt. To recover fatty material from such tarry substance, it is preferably Twitchellized or converted into soap which is then split with acid in order to liberate the fatty acids which may thereafter be purified by distillation.

The separation of such tarry substance is not observed in oil recovery procedures as normally practiced on spent kieselguhr or bleaching clay, and the retention of this material together with suspended guhr or clay may account for the high impurity content of recovered oil obtained in prior practices.

The value of the present process over prior clarification methods resides not only in the fact that the oil recovered from the spent cake is of higher quality but also in the fact that the amount of such higher quality oil recovered is substantially greater, and this is true even though separated tarry substances containing recoverable fatty material are discarded.

The following examples will illustrate specific conditions which may be employed in the practice of the invention, but it is to be understood that these examples are given merely to aid in the complete understanding of the invention and are not to be considered as limiting the scope of the appended claims.

*Example 1.*—400 parts of dark tallow containing about 1½% moisture were heated to reduce the moisture content to less than 0.2%.

The dried tallow, containing 0.06% filterable impurities, was cooled to 180° F., then thoroughly agitated with 4 parts by weight of powdered sodium chloride of which 67.2% was sufficiently fine to pass through a 150 mesh screen, 51.4% being sufficiently fine to pass through a 200 mesh screen.

The mixture of tallow and sodium chloride at 180° F. was then pumped to a filter press and filtered in the usual manner. The filter cake was blown with air to remove as much retained oil as possible.

The improvement effected in the quality of the stock, as indicated by its odor and by the results obtained on hydrolysis and distillation of the filtered material, was as good as that noted in the case of the same stock filtered with kieselguhr.

The following observations were made in connection with the recovery of oil from the press cake which was removed from the press by manual cleaning.

In the present example the total fatty acid content of the press cake was 23.6%. One part of this press cake was mixed with 10 parts of water at 150° F. in a tank and stirred until the inorganic salt had dissolved. The mixture was then allowed to settle. The fatty portion separated to two layers, a clear oil layer and a very small amount of a dark colored layer which was discarded. The total fatty acid content of the clear oil layer was substantially 100% of the total fatty acid in the salt cake treated.

In the place of the sodium chloride used in this example, sodium sulfate, magnesium sulfate, magnesium chloride, or any of the other inorganic salts previously mentioned or suitable mixtures thereof may be substituted.

*Example 2.*—In a recovery similar to that set forth in Example 1 and conducted on a sodium chloride press cake from dark tallow filtration, the press cake contained 31.1% total fatty acid and was treated with 10 times its weight of water, the mixture being boiled and settled. The fatty portion settled into two layers as in Example 1, except that the heavier fatty layer was very dark, viscous, and tarry in appearance. The two fatty fractions were separated, then analyzed. Of the total fatty acid in the salt cake, the oil fraction contained 89.3% and the tarry fraction contained 8.7%, 2% being unaccounted for.

*Example 3.*—The process of the present invention was applied to a very low grade of tank bottoms. This material contained about 22% moisture and about 9% filterable impurities. The stock was vacuum dried at a temperature sufficient to remove all of the water before being subjected to filtration. The dried stock contained substantially no moisture, but did contain about 11.8% filterable impurities.

To 400 parts of the dried material were added approximately 20 parts of ground sodium chloride as in Example 1. The filtered stock contained no filterable impurities and was highly improved in odor.

The press cake from this filtration contained about 35% total fatty acid. When this cake was subjected to a procedure for recovery of retained oil as in Example 2, a fatty fraction containing about 62% of the total fatty acid in the cake was obtained. No recovery could be made from a press cake resulting from the use of kieselguhr filter-aid on this tank bottoms stock.

In the treatment of oils such as tank bottoms and acidulated cottonseed foots, which contain a high proportion of filterable impurities, emulsion difficulties may be encountered during the retained oil recovery process when water is used. In such instances, the substitution of a 1% solution of sulfuric acid for the water materially aids in avoiding emulsions and results in a greater yield of recovered oil. However, acid resistant equipment should be used in such operations.

Although the present process finds its greatest use and advantages in the treatment of glyceride stocks containing an unusually large proportion of filterable impurities such as may be found in raw tallow, greases, acidulated cottonseed foots and the like, the process is not limited thereto and may be used in other filtration operations to clarify oils such as crude or refined corn oil, cottonseed oil, soybean oil, sesame oil, sunflower seed oil, olive oil, peanut oil, coconut oil, palm kernel oil, palm oil, fish oils, whale oil and the like.

Having thus described my invention, what I claim and desire to secure by Letters Patent is:

1. In the process of filtering a glyceride oil with the assistance of a filter-aid and of recovering retained oil from the spent filter-aid, the steps comprising depositing on a filtering medium a coating of a filter-aid consisting of a finely divided water-soluble, oil-insoluble, solid inorganic salt which is chemically inert to said oil and which is in particle size from about 150 mesh to about 300 mesh, passing said oil through said coating and said filtering medium thereby removing filterable impurities from the oil, treating the filter cake of inorganic salt, impurities, and retained oil with water and dissolving the water-soluble salt and thereby liberating retained oil, and separating the liberated oil from the salt solution and impurities.

2. The process of claim 1 in which the inorganic salt is sodium chloride.

3. The process of claim 1 in which the inorganic salt is sodium sulfate.

4. The process of claim 1 in which the inorganic salt is magnesium sulfate.

5. A process for separating filterable impurities from glyceride oils in a filtering operation employing a filter-aid and for recovering retained oil from the spent filter-aid, which comprises mixing a glyceride oil containing not substantially more than 0.2 per cent moisture with a filter-aid consisting of a solid, water-soluble, oil-insoluble inorganic salt which is chemically inert to said oil and which is in particle form from about 150 to about 300 mesh in size, filtering the oil-salt mixture through a filtering medium which retains the said inorganic salt, thereafter treating the filter cake of inorganic salt, adsorbed impurities and retained oil with water, dissolving the inorganic salt and simultaneously liberating retained oil, and thereafter separating the liberated oil from the aqueous salt solution.

6. The process of claim 5 in which the weight of inorganic salt mixed with the oil is from about ¼% to about 5% of the weight of the oil.

7. The process of claim 5 in which the inorganic salt is sodium chloride and in which the weight of sodium chloride mixed with the oil is from about ¼% to about 5% of the weight of the oil.

8. A process for separating filterable impurities from glyceride oils in a filter operation employing a filter-aid, and for recovering oil from the spent filter-aid, which comprises mixing with the oil a filter-aid consisting of a water-soluble, oil-insoluble, solid inorganic salt which is chemically inert to said oil and which is in particle form from about 150 to about 300 mesh in size, filtering the oil-salt mixture through a filtering medium which retains the said inorganic salt and adsorbed impurities, removing the filter cake of inorganic salt, impurities, and retained oil from the filtering medium, treating said filter cake with water to dissolve the inorganic salt and liberate retained oil, the temperature of the water being from about 150° F. to boiling, and thereafter separating the liberated retained oil from the aqueous salt solution.

9. A process for separating filterable impurities from glyceride oils in a filter operation employing a filter-aid, and for recovering oil from the spent filter-aid, which comprises mixing with the oil a filter-aid consisting of a water-soluble, oil-insoluble, solid inorganic salt which is chemically inert to said oil and which is in particle form from about 150 to about 300 mesh in size, filtering the oil-salt mixture through a filtering medium which retains the said inorganic salt and adsorbed impurities, thereafter backwashing the filter cake of inorganic salt, impurities, and retained oil with water at a temperature from about 150° F. to boiling, and in amount sufficient to dissolve the inorganic salt and flush filtered impurities and retained oil from the filtering medium, and thereafter separating the liberated retained oil from the aqueous salt solution.

HERBERT KENNETH McCLAIN.

REFERENCES CITED

The following references are of record in the file of this patent:

UNITED STATES PATENTS

| Number | Name | Date |
|---|---|---|
| 1,114,095 | Baskerville | Oct. 20, 1914 |
| 1,284,750 | Munro | Nov. 12, 1918 |
| 1,701,092 | Zoul | Feb. 5, 1929 |
| 1,770,052 | Voorhees | July 8, 1930 |
| 2,140,574 | Cerf | Dec. 20, 1938 |
| 2,305,657 | Aehnelt | Dec. 22, 1942 |

FOREIGN PATENTS

| Number | Country | Date |
|---|---|---|
| 3,114 | Great Britain | of 1863 |